US012651969B2

(12) United States Patent
Tan et al.

(10) Patent No.: US 12,651,969 B2
(45) Date of Patent: Jun. 9, 2026

(54) POWER CONVERSION CIRCUIT OF MULTI-PHASE POWER SUPPLY AND MULTI-PHASE POWER SUPPLY AND CONTROL METHOD THEREFOR

(71) Applicant: SG MICRO CORP, Beijing (CN)

(72) Inventors: Lei Tan, Beijing (CN); Xiang Yu, Beijing (CN); Junzhe Hao, Beijing (CN)

(73) Assignee: SG MICRO CORP, Beijing (CN)

( * ) Notice: Subject to any disclaimer, the term of this patent is extended or adjusted under 35 U.S.C. 154(b) by 329 days.

(21) Appl. No.: 18/550,163

(22) PCT Filed: Apr. 8, 2022

(86) PCT No.: PCT/CN2022/085787
§ 371 (c)(1),
(2) Date: Sep. 12, 2023

(87) PCT Pub. No.: WO2022/214073
PCT Pub. Date: Oct. 13, 2022

(65) Prior Publication Data
US 2024/0154531 A1      May 9, 2024

(30) Foreign Application Priority Data

Apr. 9, 2021      (CN) .......................... 202110383005.7

(51) Int. Cl.
H02M 3/158 (2006.01)
H02M 1/00 (2006.01)
(Continued)

(52) U.S. Cl.
CPC ....... H02M 3/1584 (2013.01); H02M 1/0025 (2021.05); H02M 1/0845 (2013.01); H02M 3/157 (2013.01)

(58) Field of Classification Search
CPC ............. H02M 3/1584; H02M 1/0025; H02M 1/0845; H02M 3/157
See application file for complete search history.

(56) References Cited

U.S. PATENT DOCUMENTS 6,222,745 B1    4/2001  Amaro et al.
6,246,222 B1    6/2001  Nilles et al.
(Continued)

FOREIGN PATENT DOCUMENTS

CN        1599188 A       3/2005
CN      102340244 A       2/2012
(Continued)

OTHER PUBLICATIONS

International Search Report and Written Opinion for International Application No. PCT/CN2022/085787, dated Jun. 9, 2022, 8 pages.
(Continued)

*Primary Examiner* — Lakaisha Jackson
(74) *Attorney, Agent, or Firm* — Westman, Champlin & Koehler, P.A.

(57) ABSTRACT

A power conversion circuit of a multi-phase power supply, a multi-phase power supply and a control method is provided. The power conversion circuit includes a PWM signal generating circuit, a driving circuit and a power circuit. The PWM signal generating circuit receives a counting code, generates a pulse width modulation signal when a count value characterized by the counting code is equal to their identification numbers, and controls on and off states of the switching transistor in the power circuit. Therefore, a plurality of phases of power conversion circuits in the multi-phase power supply may share one timing circuit to control on times of respective ones of the power conversion circuits, which is beneficial for reducing complexity and cost of the controller, and reducing circuit size and cost of the multi-
(Continued)

200 phase power supply, and for implementation of a multi-phase power supply with higher phase numbers.

19 Claims, 5 Drawing Sheets

(51) Int. Cl.
    *H02M 1/084*     (2006.01)
    *H02M 3/157*     (2006.01)

(56)               References Cited

U.S. PATENT DOCUMENTS

| | | | |
|---|---|---|---|
| 8,400,125 | B2 | 3/2013 | Markowski |
| 8,525,500 | B1 | 9/2013 | Martin |
| 8,624,567 | B2 | 1/2014 | Popescu |
| 9,007,048 | B2 | 4/2015 | Chen et al. |
| 9,461,544 | B2 | 10/2016 | Nien et al. |
| 9,843,252 | B1 | 12/2017 | Chang et al. |
| 10,917,015 | B2 | 2/2021 | Trichy et al. |
| 11,245,323 | B2 | 2/2022 | Sun |
| 11,356,023 | B2 | 6/2022 | Jiang et al. |
| 11,552,546 | B2 | 1/2023 | Sun |
| 11,621,640 | B2 | 4/2023 | Huang et al. |
| 2004/0146101 | A1 | 7/2004 | Pearce |
| 2010/0097041 | A1 | 4/2010 | Ayukawa et al. |
| 2011/0022877 | A1 | 1/2011 | Hopkins |
| 2011/0074378 | A1 | 3/2011 | Markowski |
| 2011/0234191 | A1* | 9/2011 | Yeon ................. H02M 3/33507 |
| | | | 323/285 |
| 2012/0262136 | A1 | 10/2012 | Nien et al. |
| 2013/0169254 | A1 | 7/2013 | Popescu |
| 2014/0049240 | A1 | 2/2014 | Chen et al. |
| 2019/0074770 | A1 | 3/2019 | Trichy et al. |
| 2021/0028704 | A1 | 1/2021 | Jiang et al. |
| 2021/0257998 | A1* | 8/2021 | Fesler ................... H02M 1/088 |
| 2021/0408890 | A1 | 12/2021 | Sun |
| 2022/0060115 | A1 | 2/2022 | Huang et al. |
| 2022/0077760 | A1 | 3/2022 | Sun |
| 2023/0246549 | A1* | 8/2023 | Davis-Marsh .......... H02M 1/15 |
| | | | 323/271 |
| 2025/0183802 | A1* | 6/2025 | Hu ........................ H02M 3/157 |

FOREIGN PATENT DOCUMENTS

| | | |
|---|---|---|
| CN | 102647074 A | 8/2012 |
| CN | 102742134 A | 10/2012 |
| CN | 202565154 U | 11/2012 |
| CN | 103187857 A | 7/2013 |
| CN | 203387392 U | 1/2014 |
| CN | 103944377 A | 7/2014 |
| CN | 102751873 B | 12/2015 |
| CN | 107819395 A | 3/2018 |
| CN | 110445380 A | 11/2019 |
| CN | 110932524 A | 3/2020 |
| CN | 111247500 A | 6/2020 |
| CN | 111600464 A | 8/2020 |
| CN | 111934552 A | 11/2020 |
| CN | 112421953 A | 2/2021 |
| DE | 102008030527 A1 | 12/2009 |
| JP | 2018074719 A | 5/2018 |

OTHER PUBLICATIONS

First Office Action, including Search Report, for Chinese Patent Application No. 202110383005.7, dated Mar. 5, 2024, 23 pages.
Translation of Chinese Office Action for Chinese Patent Application No. 2021103830057, dated Nov. 6, 2024, 15 pages.
Zimnik, "Digital Power Control of Load Point Converter", Texas Instruments, Electronic Design Applications, vol. 07, Jul. 1, 2009, 10 pages.
Wang et al., "Implementation of TLC549A/D conversion circuit on EDA experimental system", Journal of Henan University of Science and Technology (Natural Science Edition), vol. 04, Dec. 30, 2002, 8 pages.

\* cited by examiner

POWER CONVERSION CIRCUIT OF MULTI-PHASE POWER SUPPLY AND MULTI-PHASE POWER SUPPLY AND CONTROL METHOD THEREFOR

CROSS-REFERENCES TO RELATED APPLICATION

This application is a Section 371 National Stage application of International Application No. PCT/CN2022/085787, filed on Apr. 8, 2022, which published as WO 2022/214073 A1, on Oct. 13, 2022, not in English, and claims priority to Chinese patent application No. 202110383005.7, filed on Apr. 9, 2021, entitled "POWER CONVERSION CIRCUIT OF MULTI-PHASE POWER SUPPLY AND MULTI-PHASE POWER SUPPLY AND CONTROL METHOD THEREFOR", the entire contents of which are incorporated herein by reference in their entireties.

FIELD OF TECHNOLOGY

The present disclosure relates to the technical field of switching power supply, an more particularly, to a power conversion circuit of a multi-phase power supply.

BACKGROUND

Due to the exponential growth in the scale of Internet of Things (IoT) cloud-based services, there are significant advances in data centers, networking and telecommunication equipment, while there are new challenges to the processing efficiency of servers in data centers with a continuous increase in data and information. Therefore, how to efficiently power and dissipate heat for these equipment while minimizing power consumption has become an important issue in the field of conventional power supply technology.

A multi-phase power supply is a technology that connects multiple power conversion circuits in parallel and distributes the switching modulation process to different phases to achieve adjustment and control of the power supply. The PWM (pulse width modulation) signals of different phases in a multi-phase power supply can be identical or different by a certain phase shift, so that frequency fluctuation at an output or an input is the product of the switching frequency of each phase and the number of phases. This can reduce the need for filter capacitors, lower the impact on input current, and accelerate the response to load changes.

FIG. 1 shows a schematic circuit diagram of a multi-phase power supply according to the prior art. As shown in FIG. 1, a conventional multi-phase power supply 100 consists of a multi-phase power supply controller 110, plural phases of power conversion circuits 101-104 (taking 4-phase multi-phase power supply as an example in FIG. 1) and a feedback control circuit 120. The power conversion circuit of each phase includes a driver, switching transistors T1 and T2, an inductor Lx and an output capacitor Cout. The switching transistors T1 and T2 are connected between an input voltage Vin and ground. The inductor Lx has a first end being connected to an intermediate node of the switching transistors T1 and T2, and a second end being connected to the first end of output capacitor Cout. The second end of output capacitor Cout is grounded. The driver in each of the power conversion circuits 101-104 receives respective one of the pulse width modulation signals PWM1-PWM4 supplied from the multi-phase power supply controller 110, control on and off states of respective transistors according to the received pulse width modulation signal, to charge the output capacitor Cout of the respective phase to generate one of output voltages Vo1-Vo4 of the respective phase, and merge the output voltages Vo1-Vo4 into an output voltage Vout to drive the load.

The multi-phase power supply controller 110 includes a plurality of PWM controllers 111-114, which determine an operation sequence of the plurality of power conversion circuits 101-104 in accordance with a feedback signal FB from the feedback control circuit 120, respectively, thereby providing the pulse width modulation signals PWM1-PWM4. The conventional multi-phase power supply controller needs the same number of PWM controllers as that of the power conversion circuits. Not only is there the problem of a complex controller structure, a large circuit size, and high circuit cost, but there is also the problem of matching between individual PWM controllers, which affects an accuracy of a current balance of plural phases of the multi-phase power supply.

SUMMARY

In view of the above problems, one object of the present disclosure is to provide a power conversion circuit and a multi-phase power supply in a multi-phase power supply and a control method thereof, which can not only reduce the circuit size and cost of the controller, but also improve the problem that circuit mismatch affects the accuracy of current balance of plural phases.

According to a first aspect of the present disclosure, there is provided a power conversion circuit of a multi-phase power supply, wherein the multi-phase power supply comprises N-phases of power conversion circuits, where N is a positive integer greater than 1, wherein the power conversion circuit comprises: a PWM signal generating circuit which receives a counting code and generates a pulse width modulation signal when the counting code meets a predetermined condition; a driving circuit which converts the pulse width modulation signal into a switch driving signal; and a power circuit which includes at least one switching transistor with on and off states being controlled by the switch driving signal to provide an output voltage of the phase in accordance with an input voltage, wherein the predetermined condition is met when a count value represented by the counting code is equal to an identification number of the power conversion circuit.

Optionally, the counting code comprises a first counting code and a second counting code, the PWM signal generating circuit is configured to generate an on signal when the first counting code meets the predetermined condition, which on signal is used for determining an on time of the at least one switching transistor, and to generate an off signal when the second counting code meets the predetermined condition, which off signal is used for determining an off time of the at least one switching transistor, and the pulse width modulation signal is obtained according to the on signal and the off signal.

Optionally, the first counting code is generated in response to a first timing signal that characterizes a sequence change of the N-phases of power conversion circuits of the multi-phase power supply, the second counting code is generated in response to a second timing signal which is delayed by a predetermined time with respect to the first timing signal.

Optionally, the first counting code and the second counting code are changed at each clock edge of the first timing signal and the second timing signal, respectively, to repeatedly output N count values in sequence.

Optionally, the N count values correspond to the identification numbers of the N-phases of power conversion circuits, respectively.

Optionally, the second timing signal is generated in response to a phase difference between the on signal and the off signal of the power conversion circuit, a predetermined time offset, an error between an output voltage and the expected voltage of the multi-phase power supply, and/or variation in an input voltage of the multi-phase power supply.

According to a second aspect of the present disclosure, there is provided a multi-phase power supply comprising: N-phases of power conversion circuits according to any of claims 1-6, wherein N is a positive integer greater than 1; and a multi-phase power supply controller which is configured to provide a counting code to the N-phases of power conversion circuits for controlling each of the N-phases of power conversion circuits to generate an output voltage according to an input voltage, wherein each of the N-phases of power conversion circuits includes a power conversion circuit which has an identification number equal to a count value represented by the counting code.

Optionally, the counting code comprises a first counting code and a second counting code, and each of the N-phases of power conversion circuits is configured to generate an on signal in accordance with the first counting code and an off signal in accordance with the second counting code, wherein the on signal is used for determining an on time of at least one switching transistor in each of the N-phases of power conversion circuits, and the off signal is used for determining an off time of at least one switching transistor in each of the N-phases of power conversion circuits.

Optionally, the multi-phase power supply controller comprises: an on-timing control circuit for generating a first timing signal, wherein the first timing signal is used for characterizing a sequence change of the N-phases of power conversion circuits; a first counter configured to perform counting in response to the first timing signal to generate the first counting code; an off-timing control circuit for generating a second timing signal, wherein the second timing signal is delayed by a predetermined time with respect to the first timing signal; and a second counter configured to perform counting in response to the second timing signal to generate the second counting code.

Optionally, the first counting code and the second counting code change at each clock signal edge of the first timing signal and the second clock edge, respectively, and repeatedly output N count value.

Optionally, the N count values correspond to identification numbers of the N-phases of power conversion circuits, respectively.

Optionally, the on-timing control circuit is implemented with a phase-locked oscillator.

Optionally, the off-timing control circuit is implemented with a phase-locked loop circuit.

Optionally, the off-timing control circuit comprises: a frequency and phase detector for receiving an on signal and an off signal of each of the N-phases of power conversion circuits and obtaining a phase difference between the on signal and the off signal; a delay control unit configured to generate a voltage control signal in response to the phase difference between the on signal and the off signal, a predetermined time offset, an error between an output voltage and the expected voltage of the multi-phase power supply, and/or variation in an input voltage of the multi-phase power supply; and a voltage-controlled oscillator configured to generate the second timing signal in accordance with the voltage control signal.

Optionally, the multi-phase power supply controller further comprises: a cross-cycle control circuit for receiving the first and second counting codes, providing a correction signal to the N-phases of power conversion circuits according to a delay between the first and second counting codes, the correction signal being used for avoiding that the delay overshoots to a previous voltage cycle or lags behind to a later voltage cycle.

According to a third aspect of the present disclosure, there is provided a control method for a multi-phase power supply comprising N-phases of power conversion circuits according to any of claims 1-6, where N is a positive integer greater than 1, wherein the control method comprises: generating a first timing signal for characterizing a sequence change of the N-phases of power conversion circuits; generating a first counting code by performing counting in response to the first timing signal; generating a second timing signal, the second timing signal being delayed by a predetermined time with respect to the first timing signal; generating a second counting code by performing counting in response to the first timing signal; and generating an output voltage in accordance with an input voltage in response to the first counting code and the second counting code in each of the N-phases of power conversion circuits, wherein each of the N-phases of power conversion circuits includes a power conversion circuit which has an identification number equal to a count value represented by the first counting code and the second counting code.

Optionally, the step of generating the output voltage in accordance with the input voltage in response to the first counting code and the second counting code in each of the N-phases of power conversion circuits comprises: generating an on signal in accordance with the first counting code and generating an off signal in accordance with the second counting code in each of the N-phases of power conversion circuits, wherein the on signal is used for determining an on time of the at least one switching transistor in each of the N-phases of power conversion circuits, and the off signal is used for determining an off time of the at least one switching transistor in each of the N-phases of power conversion circuits.

Optionally, the first counting code and the second counting code change at each clock edge of the first timing signal and the second timing signal, respectively, to repeatedly output N count values in sequence.

Optionally, the N count values correspond to identification numbers of the N-phases of power conversion circuits, respectively.

Optionally, the step of generating the second timing signal comprises: generating the second timing signal in response to a phase difference between an on signal and an off signal of each of the N-phases of power conversion circuits, a predetermined time offset, an error between an output voltage and the expected voltage of the multi-phase power supply, and/or variation in an input voltage of the multi-phase power supply.

Optionally, the control method also comprises providing a correction signal to the N-phases of power conversion circuits according to a delay between the first and second counting codes, the correction signal being used for avoiding that the delay overshoots to a previous voltage cycle or lags behind to a later voltage cycle.

The multi-phase power supply of the present disclosure provides a power conversion circuit. The power conversion circuit includes a PWM signal generating circuit, a driving circuit and a power circuit. The PWM signal generating circuit is used for receiving a counting code, generating a pulse width modulation signal when a count value characterized by the counting code is equal to their identification numbers, and controlling on and off states of the switching transistor in the power circuit. Therefore, a plurality of phases of power conversion circuits in the multi-phase power supply may share one timing circuit to control on times of respective ones of the power conversion circuits, which is beneficial for reducing complexity and cost of the controller.

The multi-phase power supply of the present disclosure also provides a multi-phase power supply controller. The multi-phase power supply controller utilizes a combination of a phase-locked oscillator and a first counter to determine the on time of each phase power conversion circuit, and employs a combination of a phase-locked loop circuit and a second counter to determine the off times of each phase power conversion circuit. In this way, the PWM controllers correspondingly configured for each phase power conversion circuit can be saved, which reduces the complexity and cost of the circuit. It also avoids the problem of current balance accuracy caused by circuit mismatch at the same time.

BRIEF DESCRIPTION OF THE DRAWINGS

Through the following description of embodiments of the present disclosure with reference to the accompanying drawings, the above and other objects, features and advantages of the present disclosure will become more apparent. In the drawings.

DESCRIPTION OF THE EMBODIMENTS

Figure 1:
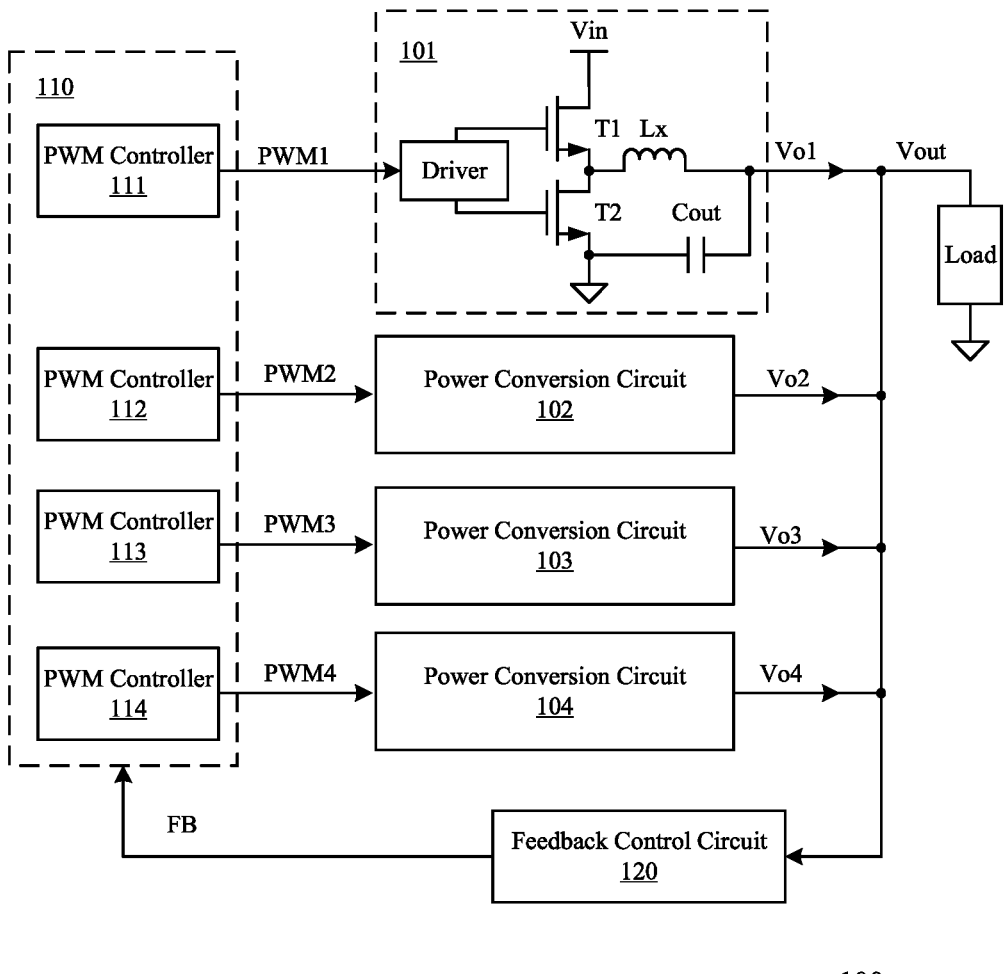
FIG. 1 shows a schematic circuit diagram of a multi-phase power supply according to the prior art.

Various embodiments of the present disclosure will be described in more detail below with reference to the accompanying drawings. Throughout the various figures, like elements are denoted by the same or similar reference numerals. For the sake of clarity, various parts in the drawings are not drawn to scale, moreover, some well-known parts may not be shown.

It should be understood that in the following description, the term "circuit" refers to a conductive loop formed by at least one component or sub-circuit through an electrical or electromagnetic connection. When a component or circuit is "connected" to another component, or a component/circuit is "connected" between two nodes, it may be directly connected or coupled to another component, or there may be an intermediate element, and the connection between the components may be physical, logical, or a combination thereof. Conversely, when a component is to be "directly coupled" or "directly connected" to another component, it means that there is no intermediate element between them.

In the present disclosure, a switching transistor is a transistor operating in a switching mode to provide a current path, including one selected from a bipolar transistor or a field effect transistor. The first terminal and the second terminal of the switching transistor are respectively a high potential terminal and a low potential terminal on the current path, and the control terminal is used for receiving a driving signal to control the on and off states of the switching transistor.

The present disclosure can be presented in various forms, and some examples will be described below.

Figure 2:
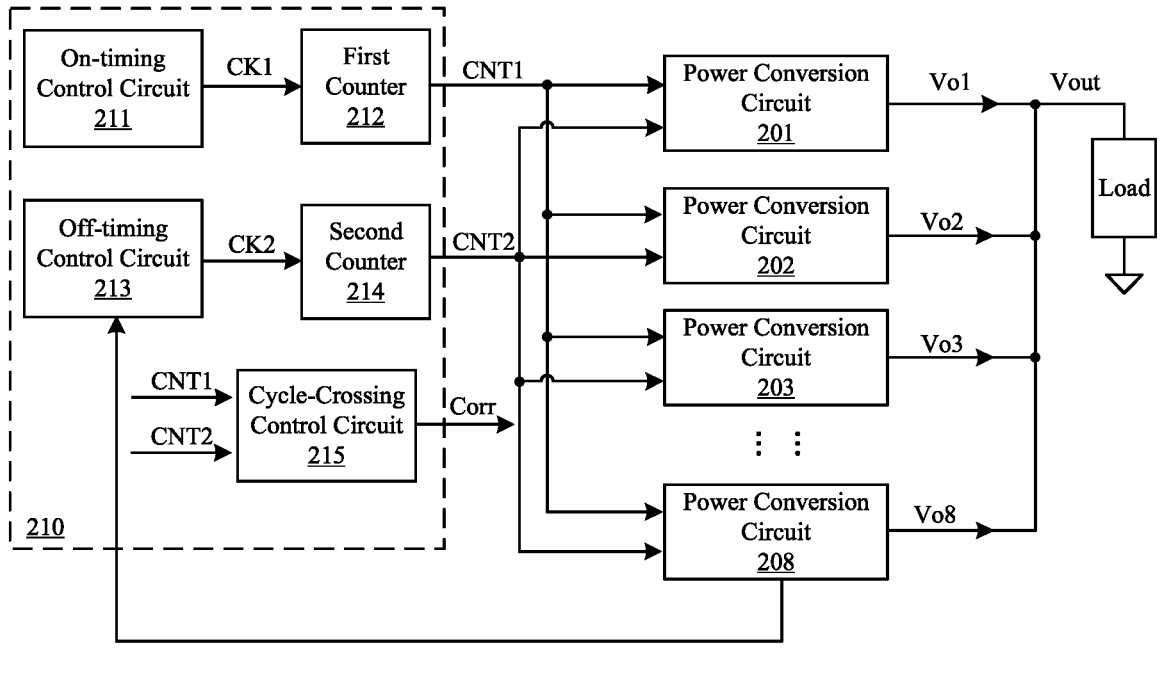
FIG. 2 shows a schematic circuit diagram of a multi-phase power supply according to an embodiment of the present disclosure.

FIG. 2 shows a schematic circuit diagram of a multi-phase power supply according to an embodiment of the present disclosure. The multi-phase power supply according to the embodiment of the present disclosure includes a multi-phase power supply controller, and N phases of power conversion circuits, where N is a positive integer greater than 1. The multi-phase power supply controller is used for controlling on sequence and on times of the N-phases of power conversion circuits to supply together an output voltage.

Specifically, as shown in FIG. 2, the multi-phase power supply 200 includes a multi-phase power supply controller 210 and 8-phases of power conversion circuits 201-208. The multi-phase power supply controller 210 is used to provide counting codes respectively to the power conversion circuits 201-208, and the counting codes are used to control each of the power conversion circuits to generate an output voltage in accordance with the input voltage. Furthermore, in each voltage cycle of the multi-phase power supply, the multi-phase power supply controller 210 sequentially outputs 8 counting values in accordance with the counting codes, so as to sequentially turn on the power conversion circuits 201-208. Each of the power conversion circuits 201-208 generates a duty cycle and corresponding one of output voltages Vo1-Vo8 in accordance with an input voltage. The output voltages Vo1-Vo8 are combined into an output voltage Vout to drive a load after fine-tuning the duty cycle by a current balancing circuit.

Further, the multi-phase power supply controller 210 includes an on-timing control circuit 211, a first counter 212, an off-timing control circuit 213 and a second counter 214. The on-timing control circuit 211 is implemented for example by a phase-locked oscillator for generating a first timing signal CK1, which characterizes a sequence change of the power conversion circuits 201-208 of the multi-phase power supply 200. The first counter 212 is configured to perform counting in response to the first timing signal CK1 to provide the power conversion circuits 201-208 with a first counting code CNT1. The power conversion circuits 201-208 sequentially compare a count value represented by the first counting code CNT1 with its identification number (the identification number is, for example, numbered according to the on sequence of the power conversion circuits 201-208). The power conversion circuit generates an on signal in accordance with the first counting code CNT1 when a count value represented by the first counting code CNT1 is equal to their identification numbers for determining an on time of at least one switching transistor of the power conversion circuit. The off-timing control circuit 213 is used to generate a second timing signal CK2 synchronized with the first timing signal CK1 and delayed by a predetermined time from the first timing signal CK1. The second counter 214 is configured to perform counting in response to the second timing signal CK2 to provide a second counting code CNT2 to the power conversion circuits 201-208. The power conversion circuits 201-208 sequentially compare a count value represented by the second counting code CNT2 to their identification numbers. The power conversion circuit generates an off signal when a count value represented by the second counting code CNT2 is equal to their identification numbers for determining an off time of the at least one switching transistor of the power conversion circuit. Wherein, the time difference between on signal and off signal is used to control the PWM time of each channel, so that the PWM controller corresponding to the power conversion circuit of each phase can be saved. Therefore, the multi-phase power supply controller according to the embodiment of the present disclosure are smaller in the circuit size and structure, the cost of the controller can be reduced, the integration level of the multi-phase power supply can be improved, and the realization of the multi-phase power supply with a higher number of phases (for example, 16 phases or 24 phases) is beneficial.

Further, the off-timing control circuit 213 collects an on signal of an off signal in one of the power conversion circuits 201-208, monitors a phase difference between the on signal and the off signal, and adds a predetermined time offset between the on signal and the off signal to obtain a second timing signal CK2, which is delayed by a predetermined time with respect to the first timing signal CK1 (see subsequent embodiments).

Further, the first counting code CNT1 and the second counting code CNT2 are realized by cyclic binary codes, for example, Gray codes. Gray code is a code that only changes one bit when adding one. The following table 1 is a three-bit Gray code coding format:

| Q2 | Q1 | Q0 | M |
|---|---|---|---|
| 0 | 0 | 0 | 0 |
| 0 | 0 | 1 | 1 |
| 0 | 1 | 1 | 3 |
| 0 | 1 | 0 | 2 |
| 1 | 1 | 0 | 6 |
| 1 | 1 | 1 | 7 |
| 1 | 0 | 1 | 5 |
| 1 | 0 | 0 | 4 |

Since only one bit changes between adjacent code words when Gray code changes, there will be no erroneous intermediate states, which makes Gray codes very useful in engineering applications.

It should be noted that the present disclosure is not limited to this. The multi-phase power supply in the embodiments of the present disclosure can also be applied to other types of binary cyclic codes, which can be selected by those skilled in the art according to specific conditions.

Further, the first counting code CNT1 and the second counting code CNT2 vary at each clock edge (e. g. rising edge or falling edge) of the first timing signal CK1 and the second clock edge CK2, respectively, so as to repeatedly output N count values corresponding to the identification numbers of N-phase power conversion circuits in one-by-one manner, where N is a positive integer greater than 1 (N=8 in this embodiment).

Figure 3:
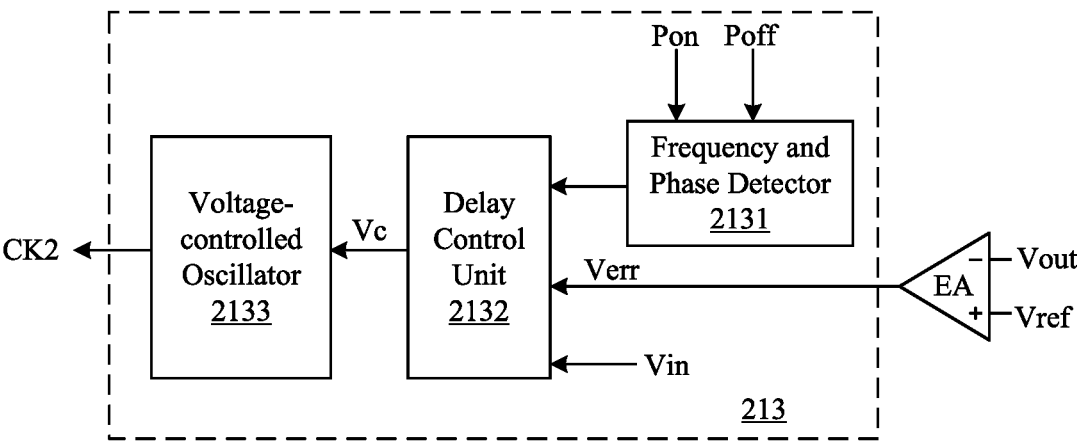
FIG. 3 shows a schematic circuit diagram of an off-timing control circuit in a multi-phase power supply according to an embodiment of the present disclosure.

Further the off-timing control circuit 213 is implemented for example by a phase-locked loop circuit. Referring to FIG. 3, the off-timing control circuit 213 includes a frequency and phase detector 2131, a delay control unit 2132, and a voltage-controlled oscillator 2133. The frequency and phase detector 2131 is used to receive an on signal Pon and an off signal Poff from one of the power conversion circuit

201-208 and to obtain a phase difference between the on signal Pon and the off signal Poff. The delay control unit 2132 is used for receiving the phase difference, and adding a predetermined off signal between on signal Pon and time offset Poff, so that the off signal Poff appears later than the on signal Pon in the power conversion circuit. The amount of time offset being added determines a delay between the on signal Pon and the off signal Poff. That is, PWM modulation is realized in the power conversion circuit. Further, the delay control unit 2132 also includes a feedback input terminal and a feed-forward input terminal. The feedback input terminal receives an error Verr between an output voltage Vout of the multi-phase power supply and an expected voltage Vref. The feed-forward input terminal is used for detecting changes in the input voltage Vin. The delay control unit 2132 supplies a voltage control signal Vc to the voltage-controlled oscillator 2133 according to the input signal, and the voltage-controlled oscillator 2133 generates a second timing signal CK2 according to the voltage control signal Vc, so that the delay generated by the delay control unit 2132 can be inherited in the subsequent oscillation process, and the PWM modulation can be realized in the power conversion circuits of subsequent phases. Among them, the feed-forward and feedback input signals can quickly used in the PWM modulation of power conversion circuits for a fast and stable control of the output voltage. The response speed of phase-locked loop is very slow, so the phase stability can be realized to eliminate an offset part of the error feedback.

According to the above description, the off-timing control circuit 213 of the present disclosure can reflect the detected phase difference between the on signal Pon and the off signal Poff as well as the feedback and feedforward inputs to a time offset between the second timing signal CK2 and the first timing signal CK1, so as to adjust the duty cycle of the PWM signal of each power conversion circuit. For example, when the output voltage Vout is low, the off-timing control circuit 213 increases the time offset between the second timing signal CK2 and the first timing signal CK1. When the multi-phase power controller 210 wants to control the next power conversion circuit, it can increase a duty cycle of the PWM signal of the next power conversion circuit to achieve fast and stable control of the output voltage. Since the on-time of the power conversion circuit of each phase is staggered, the present disclosure adopts the method of using the combination of a phase-locked oscillator and counter to provide information about the on-time required by the power conversion circuit of each phase, which can avoid the circuit mismatch issue with multiple PWM controllers.

It should be noted that the implementation of the voltage controlled oscillator 2133 is a common technical means in the art, and will not be described redundantly here.

Further referring to FIG. 2, in general, a voltage controlled oscillator 2133 generally needs to ensure that the delay generated by the delay control module 2132 will not advance to the previous voltage cycle or lag behind to the next voltage cycle. However, in the actual operation of the multi-phase power supply, such a situation still cannot be avoided. Therefore, in the preferred embodiment, the multi-phase power controller 210 further includes a cycle-crossing control circuit 215. The cycle-crossing control circuit 215 is configured to receive the first counting code CNT1 and the second counting code CNT2, and generate a correction signal Corr based on the delay between the first counting code CNT1 and the second counting code CNT2. The correction signal Corr can avoid the delay advancing to the previous voltage cycle or lagging behind to the next voltage cycle.

Figure 4:
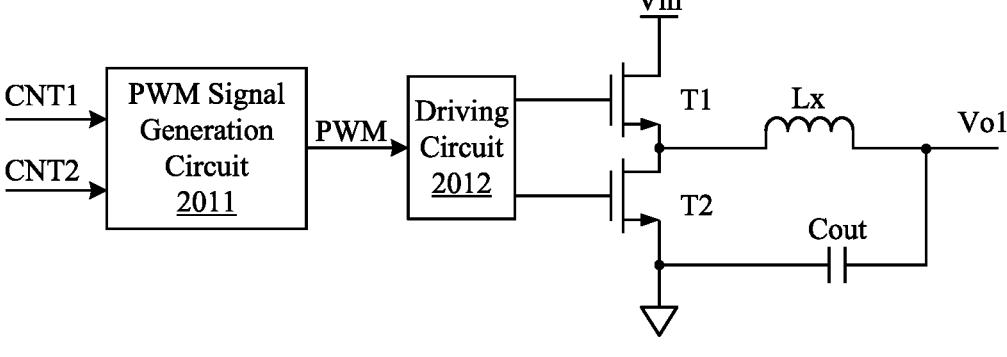
FIG. 4 shows a schematic circuit diagram of the power conversion circuit in the multi-phase power supply according to the present disclosure embodiment.

FIG. 4 shows a schematic circuit diagram of a power conversion circuit in a multi-phase power supply according to an embodiment of the present disclosure. The structures of the multiple power conversion circuits in the multi-phase power supply are identical. FIG. 4 illustrates the power conversion circuit 201. As shown in FIG. 4, the power conversion circuit 201 has a Buck topology, which includes a PWM signal generation circuit 2011, a driving circuit 2012 and a power circuit. The power circuit includes switching transistors T1 and T2 connected in series between an input terminal and ground, an inductor Lx connected between an intermediate node of the switching transistors T1 and T2 and an output terminal, and an output capacitor Cout connected between the output terminal and ground. The input terminal of the power conversion circuit 201 receives an input voltage Vin, and the output terminal provides an output voltage Vo1 of the respective phase.

The PWM signal generation circuit 2011 receives the first counting code CNT1 and the second counting code CNT2, and compares the count values represented by the first counting code CNT1 and the second counting code CNT2 with its identification information, and determines on time and off time of the switching transistors T1 and T2 based on the comparison result. Further, the PWM signal generation circuit 2011 is configured to generate an on-signal and an off-signal when the count values represented by the first counting code CNT1 and the second counting code CNT2 are equal to its identification information, respectively. The on-signal is used to determine the on-time of the switching transistor T1, and the off-signal is used to determine the off-time of the switching transistor T1. The PWM signal generation circuit 2011 generates the PWM signal based on the on-signal and the off-signal. The driving circuit 2012 converts the PWM signal into a switch driving signal to control on and off states of the switching transistor T1 and the switching transistor T2, thereby generating the output voltage Vo1 of the respective phase based on the input voltage Vin.

It should be understood that the multi-phase power supply of the embodiments of the present disclosure can also be applied to power conversion circuits of other topologies. The structure of the power circuit includes but is not limited to floating Buck power circuit, grounded Buck power circuit, inverting power circuit, Buck-boost power circuit, Boost power circuit and other topologies.

Figure 5:
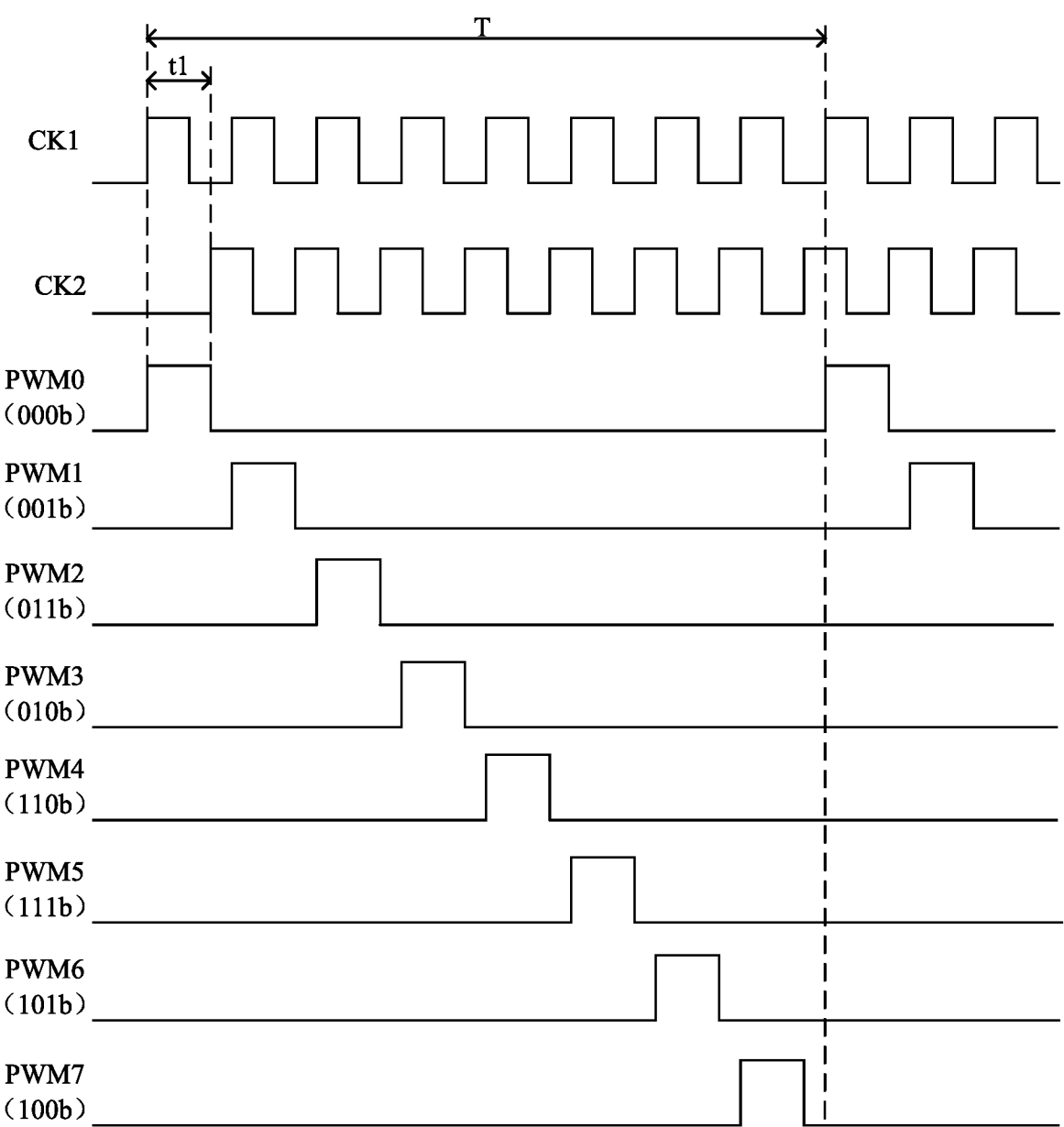
FIG. 5 shows a schematic timing chart of multi-phase power supply operation according to an embodiment of the present disclosure.

FIG. 5 shows a schematic timing chart of the operation of the multi-phase power supply according to an embodiment of the present disclosure. In FIG. 5, a delay between the second timing signal CK2 and the first timing signal CK1 is t1. PWM0-PWM7 represent waveform diagrams of PWM signals of the power conversion circuits 201-208, respectively. Numbers in parentheses after PWM0-PWM7 indicate Gray codes of the power conversion circuits 201-208, respectively. In this embodiment, the first counting code CNT1 and the second counting code CNT2 use 3-bit Gray code. The first counting code CNT1 and the second counting code CNT2 change at rising edges of the first timing signal CK1 and the second timing signal CK2, respectively. There are $2^3$ count values which are output in one voltage cycle T. As shown in Table 1, a change sequence of the first counting code CNT1 and the second counting code CNT2 in the counting process is 000→001→011→010→110→111→101→100, respectively, corresponding to a sequence of the PWM signals PWM0→PWM1→PWM2→PWM3→PWM4→PWM5→PWM6→PWM7.

As shown in FIG. 5, at a first rising edge of the first timing signal CK1, the first counting code CNT1 is 000, the power conversion circuit 201 works, and the PWM signal PWM0 switches to high level. At a first rising edge of the second timing signal CK2, the second counting code CNT2 is 000, and the PWM signal PWM0 switches from high level to low level. At the second rising edge of the first timing signal CK1, the first counting code CNT1 is 001, the power conversion circuit 202 starts working, and the PWM signal PWM1 switches to high level. At the second rising edge of the second timing signal CK2, the second counting code CNT2 is 001, and the PWM signal PWM1 switches from high level to low level. At the third rising edge of the first timing signal CK1, the first counting code CNT1 is 011, the power conversion circuit 203 starts working, and the PWM signal PWM2 switches from low level to high level. At the third rising edge of the second timing signal CK2, the second counting code CNT2 is 011, and the PWM signal PWM2 switches from high level to low level, and so on.

It should be noted that the setting of the Gray codes of the power conversion circuits 201-208 is not limited to this embodiment. Those skilled in the art can assign sequence code to the power conversion circuits 201-208 according to the specific conditions.

It should be understood that although an 8-phase multi-phase power supply is taken as an example to illustrate the present disclosure in FIG. 2, the multi-phase power controller of the present disclosure can be applied to power conversion circuits of any number of phases. Moreover, since the multi-phase power controller of the present disclosure has smaller circuit scale and structure, the multi-phase power supply of the present disclosure can be applied to a larger number of phases (e.g. 16 phases or 24 phases).

In summary, the multi-phase power supply of the present disclosure provides a power conversion circuit including a PWM signal generation circuit, a driving circuit and a power circuit. The PWM signal generating circuit is used for receiving a counting code, generating a pulse width modulation signal when a count value characterized by the counting code is equal to their identification numbers, and controlling on and off states of the switching transistor in the power circuit. Therefore, a plurality of phases of power conversion circuits in the multi-phase power supply may share one timing circuit to control on times of respective ones of the power conversion circuits, which is beneficial for reducing complexity and cost of the controller.

The multi-phase power supply of the present disclosure also provides a multi-phase power supply controller. The multi-phase power supply controller utilizes a combination of a phase-locked oscillator and a first counter to determine the on time of each phase power conversion circuit, and employs a combination of a phase-locked loop circuit and a second counter to determine the off times of each phase power conversion circuit. In this way, the PWM controllers correspondingly configured for each phase power conversion circuit can be saved, which reduces the complexity and cost of the circuit. It also avoids the problem of current balance accuracy caused by circuit mismatch at the same time.

In the above description, the well-known structural elements and steps are not explained in detail. However it will be understood by those skilled in the art that the corresponding structural elements and steps can be realized by various technical means. In addition in order to form the same structural elements those skilled in the art may devise methods that are not exactly the same as those described above. In addition although the embodiments are described separately above this does not mean that the measures in the embodiments cannot be advantageously used in combination.

These embodiments are not exhaustively described in all detail in accordance with the present disclosure practices such as the above and are not limited to specific embodiments of the invention only. Obviously, according to the above description, many modifications and changes can be made. These embodiments are selected and specifically described in this specification in order to better explain the principle and practical application of the present disclosure, so that technicians in the technical field can make good use of the present disclosure and its modification based on the present disclosure. The scope of protection of the present disclosure rights shall be subject to the scope defined in the present disclosure's claims.

What is claimed is:

1. A power conversion circuit of a multi-phase power supply, wherein the multi-phase power supply comprises N-phases of power conversion circuits, where N is a positive integer greater than 1, wherein the power conversion circuit comprises:

a PWM signal generating circuit which receives a counting code and generates a pulse width modulation signal when the counting code meets a predetermined condition;

a driving circuit which converts the pulse width modulation signal into a switch driving signal; and a power circuit which includes at least one switching transistor with on and off states being controlled by the switch driving signal to provide an output voltage of respective one of the N-phases in accordance with an input voltage, wherein the predetermined condition is met when a count value represented by the counting code is equal to an identification number of the power conversion circuit, wherein the counting code comprises a first counting code and a second counting code, the PWM signal generating circuit is configured to generate an on signal when the first counting code meets the predetermined condition, which the on signal is used for determining an on time of the at least one switching transistor, and to generate an off signal when the second counting code meets the predetermined condition, which the off signal is used for determining an off time of the at least one switching transistor, and the pulse width modulation signal is obtained according to the on signal and the off signal.

2. The power conversion circuit according to claim 1, wherein the first counting code is generated in response to a first timing signal that characterizes a sequence change of the N-phases of power conversion circuits of the multi-phase power supply, the second counting code is generated in response to a second timing signal which is delayed by a predetermined time with respect to the first timing signal.

3. The power conversion circuit according to claim 2, wherein the first counting code and the second counting code are changed at each clock edge of the first timing signal and the second timing signal, respectively, to repeatedly output N count values in sequence.

4. The power conversion circuit according to claim 3, wherein the N count values correspond to the identification numbers of the N-phases of power conversion circuits, respectively.

5. The power conversion circuit according to claim 2, wherein the second timing signal is generated in response to a phase difference between the on signal and the off signal of the power conversion circuit, a predetermined time offset, an error between the output voltage and the expected voltage of the multi-phase power supply, and/or variation in an input voltage of the multi-phase power supply.

6. A multi-phase power supply comprising:

N-phases of power conversion circuits according to claim 1, wherein N is a positive integer greater than 1; and a multi-phase power supply controller which is configured to provide the counting code to the N-phases of power conversion circuits for controlling each of the N-phases of power conversion circuits to generate the output voltage according to the input voltage, wherein each of the N-phases of power conversion circuits includes the power conversion circuit which has the identification number equal to the count value represented by the counting code.

7. The multi-phase power supply according to claim 6, wherein the counting code comprises a first counting code and a second counting code, and each of the N-phases of power conversion circuits is configured to generate an on signal in accordance with the first counting code and an off signal in accordance with the second counting code, wherein the on signal is used for determining an on time of at least one switching transistor in each of the N-phases of power conversion circuits, and the off signal is used for determining an off time of at least one switching transistor in each of the N-phases of power conversion circuits.

8. The multi-phase power supply according to claim 7, wherein the multi-phase power supply controller comprises:

an on-timing control circuit for generating a first timing signal, wherein the first timing signal is used for characterizing a sequence change of the N-phases of power conversion circuits;

a first counter configured to perform counting in response to the first timing signal to generate the first counting code;

an off-timing control circuit for generating a second timing signal, wherein the second timing signal is delayed by a predetermined time with respect to the first timing signal; and a second counter configured to perform counting in response to the second timing signal to generate the second counting code.

9. The multi-phase power supply according to claim 8, wherein the first counting code and the second counting code change at each clock edge of the first timing signal and the second timing signal, respectively, to repeatedly output N count values in sequence.

10. The multi-phase power supply according to claim 9, wherein the N count values correspond to identification numbers of the N-phases of power conversion circuits, respectively.

11. The multi-phase power supply according to claim 8, wherein the on-timing control circuit is implemented with a phase-locked oscillator.

12. The multi-phase power supply according to claim 8, wherein the off-timing control circuit is implemented with a phase-locked loop circuit, and comprises:

a frequency and phase detector for receiving the on signal and the off signal of each of the N-phases of power conversion circuits and obtaining a phase difference between the on signal and the off signal;

a delay control unit configured to generate a voltage control signal in response to the phase difference between the on signal and the off signal, a predetermined time offset, an error between an output voltage and an expected voltage of the multi-phase power supply, and/or variation in the input voltage of the multi-phase power supply; and a voltage-controlled oscillator configured to generate the second timing signal in accordance with the voltage control signal.

13. The multi-phase power supply according to claim 8, wherein the multi-phase power supply controller further comprises:

a cross-cycle control circuit for receiving the first and second counting codes, providing a correction signal to the N-phases of power conversion circuits according to a delay between the first and second counting codes, the correction signal being used for avoiding that the delay overshoots to a previous voltage cycle or lags behind to a later voltage cycle.

14. A control method for the multi-phase power supply comprising N-phases of power conversion circuits according to claim 1, where N is a positive integer greater than 1, wherein the control method comprises:

generating a first timing signal for characterizing a sequence change of the N-phases of power conversion circuits;

generating a first counting code by performing counting in response to the first timing signal;

generating a second timing signal, the second timing signal being delayed by a predetermined time with respect to the first timing signal;

generating a second counting code by performing counting in response to the first timing signal; and generating the output voltage in accordance with the input voltage in response to the first counting code and the second counting code in each of the N-phases of power conversion circuits, wherein each of the N-phases of power conversion circuits includes the power conversion circuit which has the identification number equal to the count value represented by the first counting code and the second counting code.

15. The control method according to claim 14, wherein the step of generating the output voltage in accordance with the input voltage in response to the first counting code and the second counting code in each of the N-phases of power conversion circuits comprises:

generating an on signal in accordance with the first counting code and generating an off signal in accordance with the second counting code in each of the N-phases of power conversion circuits, wherein the on signal is used for determining an on time of at least one switching transistor in each of the N-phases of power conversion circuits, and the off signal is used for determining an off time of the at least one switching transistor in each of the N-phases of power conversion circuits.

16. The control method according to claim 14, wherein the first counting code and the second counting code change at each clock edge of the first timing signal and the second timing signal, respectively, to repeatedly output N count values in sequence.

17. The control method according to claim 16, wherein the N count values correspond to identification numbers of the N-phases of power conversion circuits, respectively.

18. The control method according to claim 14, wherein the step of generating the second timing signal comprises:

generating the second timing signal in response to a phase difference between an on signal and an off signal of each of the N-phases of power conversion circuits, a predetermined time offset, an error between the output voltage and an expected voltage of the multi-phase power supply, and/or variation in the input voltage of the multi-phase power supply.

19. The control method according to claim 14, further comprising: providing a correction signal to the N-phases of power conversion circuits according to a delay between the first counting code and the second counting code, the correction signal being used for avoiding that the delay overshoots to a previous voltage cycle or lags behind to a later voltage cycle.

* * * * *